(No Model.) 5 Sheets—Sheet 1.
E. H. AMET.
AUTOMATIC SCALE FOR WEIGHING CARS AND RECORDING THE WEIGHTS.
No. 392,531. Patented Nov. 6, 1888.
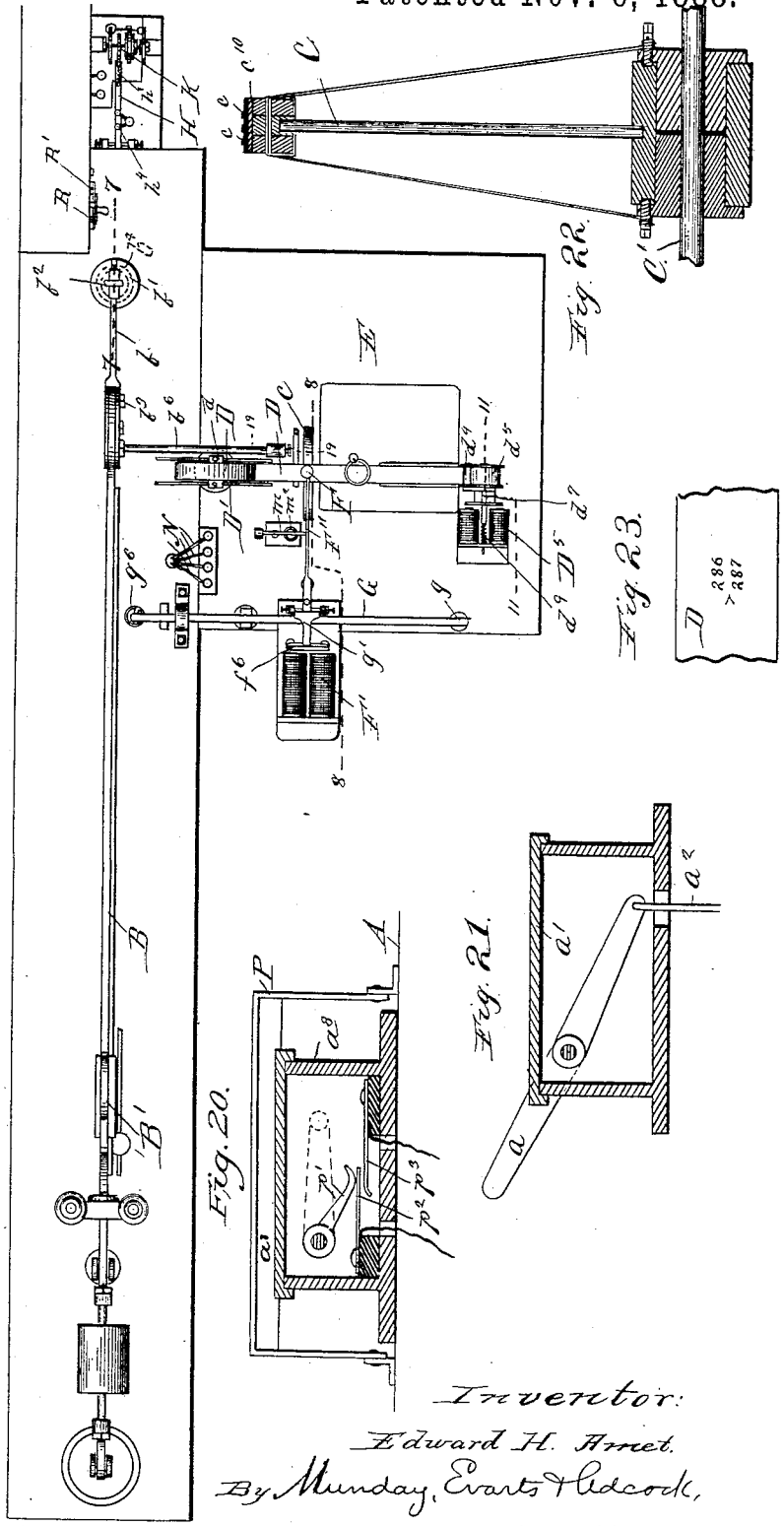
Witnesses:
Lew. E. Curtis
H. M. Munday
Inventor:
Edward H. Amet.
By Munday, Evarts & Adcock,
His Atty's.

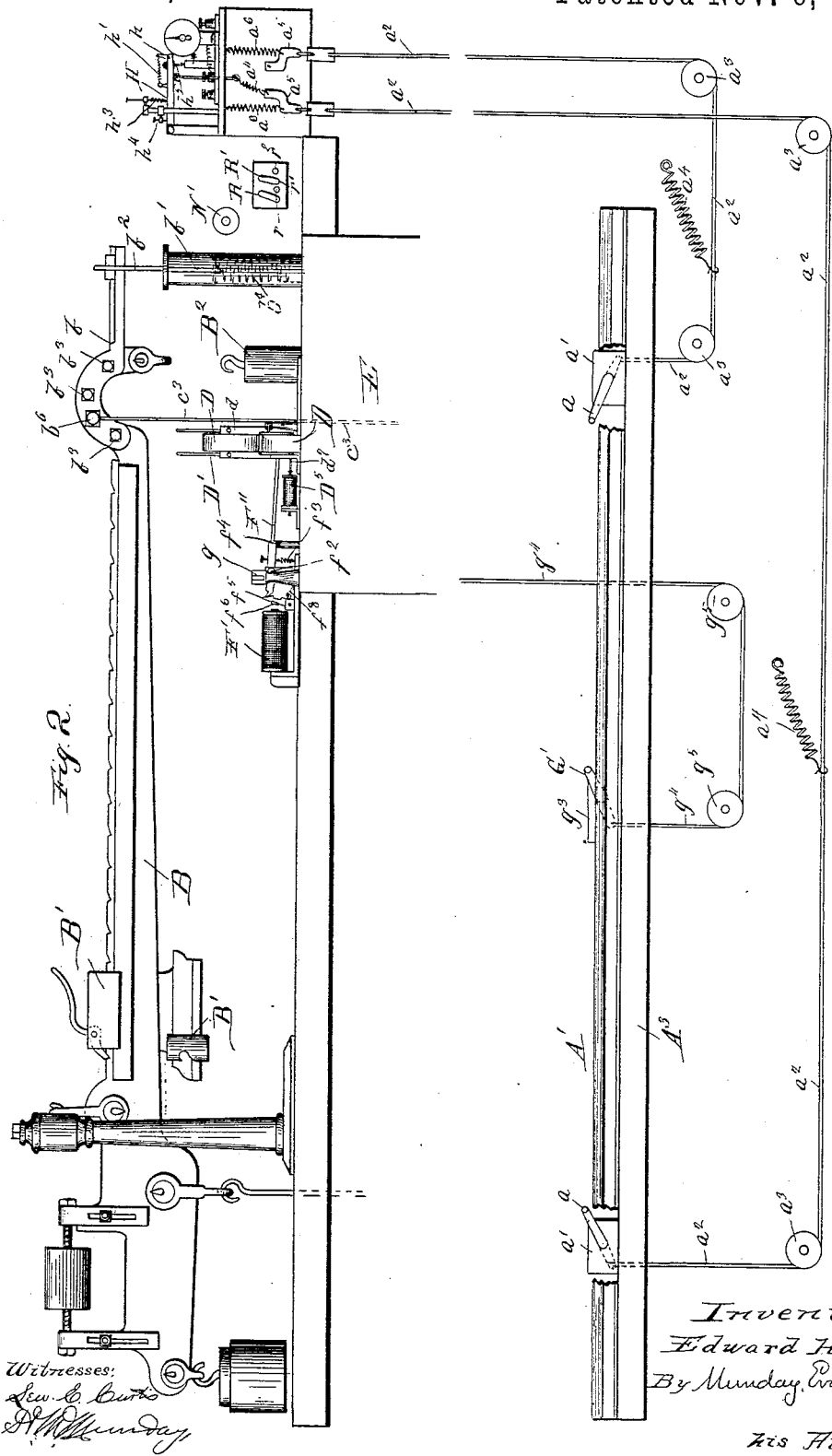

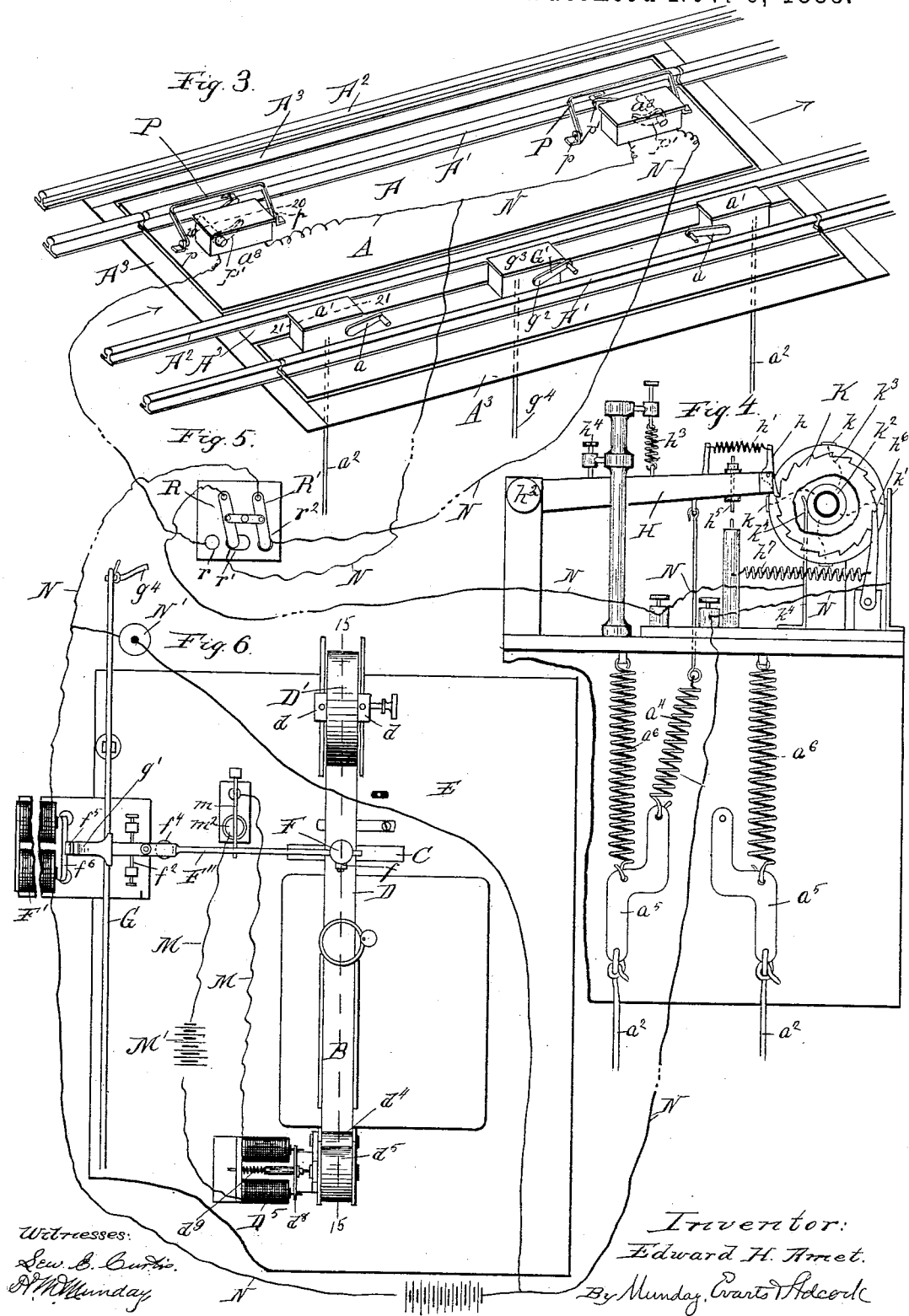

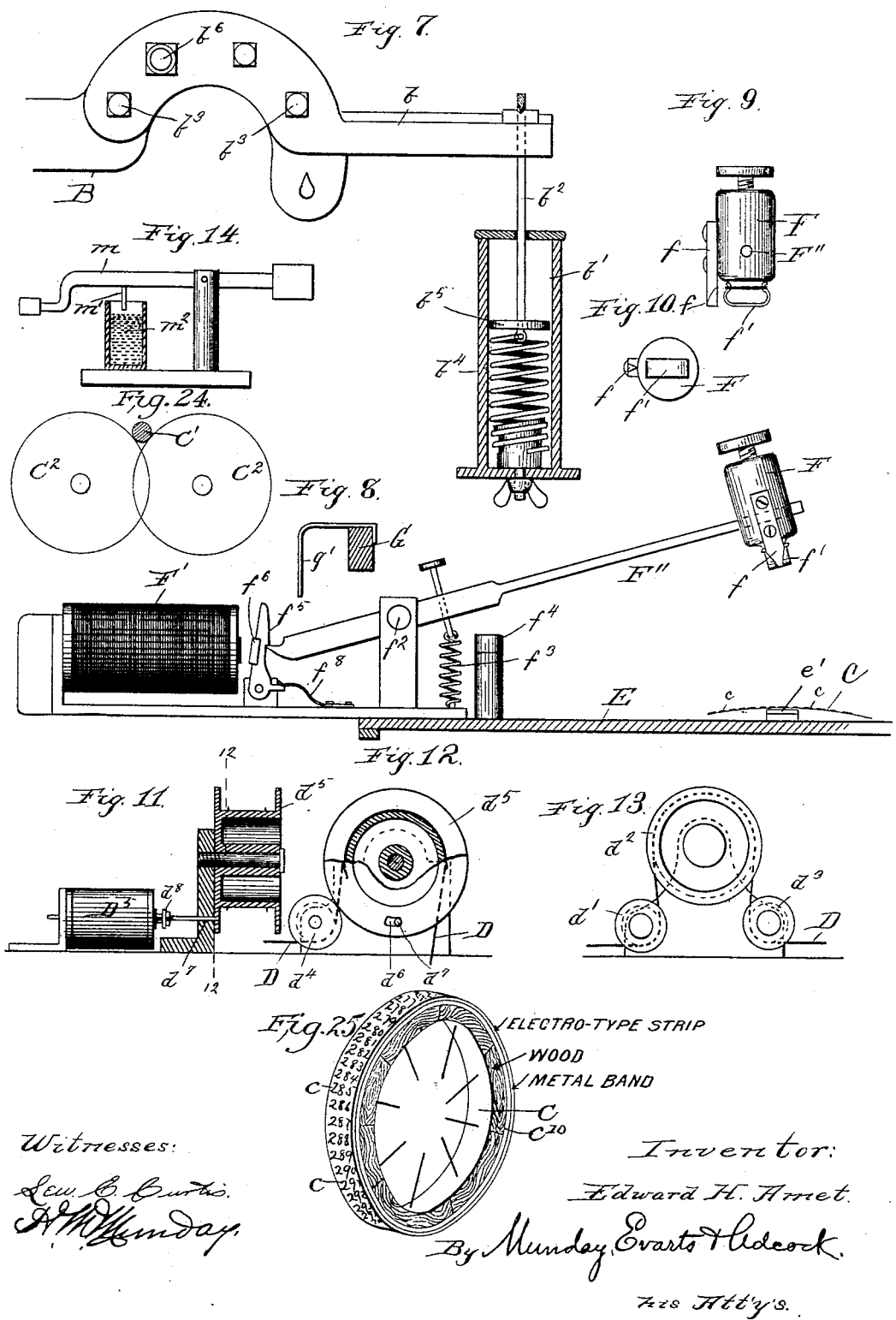

(No Model.) 5 Sheets—Sheet 5.
E. H. AMET.
AUTOMATIC SCALE FOR WEIGHING CARS AND RECORDING THE WEIGHTS.
No. 392,531. Patented Nov. 6, 1888.
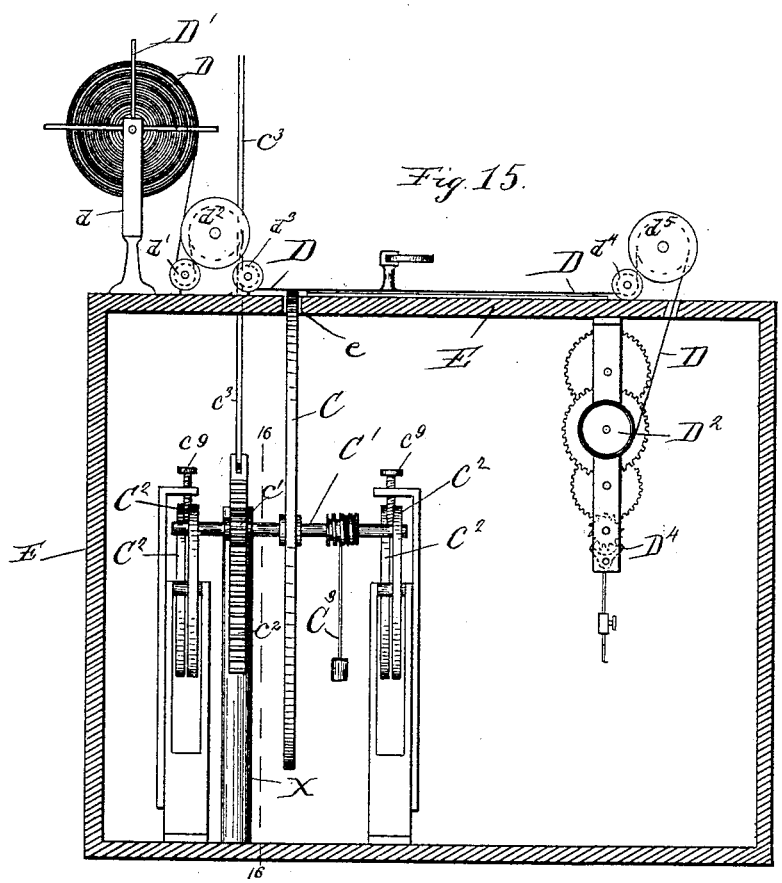
Fig. 15.
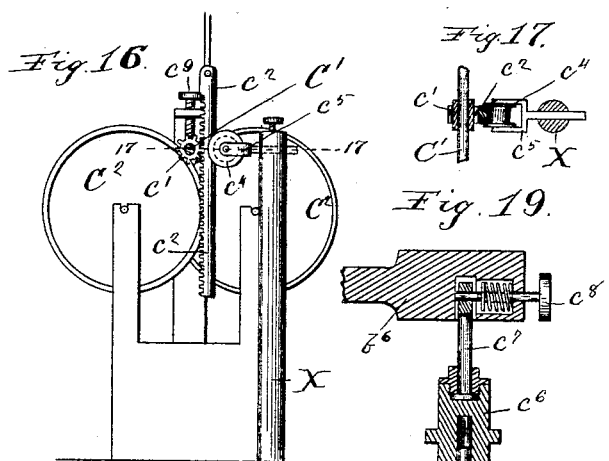
Fig. 16.
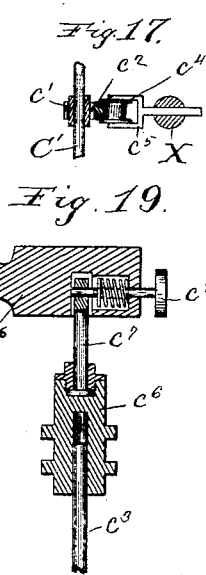
Fig. 17. Fig. 18.
Fig. 19.
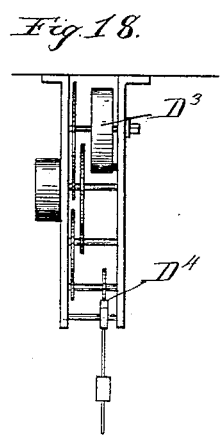
Witnesses:
Geo. C. Curtis
J. W. Munday
Inventor:
Edward H. Amet.
By Munday, Evarts & Adcock
His Atty's:

UNITED STATES PATENT OFFICE.

EDWARD H. AMET, OF CHICAGO, ILLINOIS, ASSIGNOR TO HERBERT A. STREETER, OF SAME PLACE.

AUTOMATIC SCALE FOR WEIGHING CARS AND RECORDING THE WEIGHTS.

SPECIFICATION forming part of Letters Patent No. 392,531, dated November 6, 1888.

Application filed March 2, 1888. Serial No. 265,965. (No model.)

*To all whom it may concern:*

Be it known that I, EDWARD H. AMET, a citizen of the United States, residing in Chicago, in the county of Cook and State of Illinois, have invented a new and useful Improvement in Automatic Scales for Weighing Cars and Recording the Weights thereof, of which the following is a specification.

My invention relates to improvements in automatic scales for weighing cars and recording the weights thereof.

The object of my present improvement is to provide means whereby the scale is adapted to weigh railway-cars of different lengths as the same pass over the scale coupled in a train, and to provide means for quickly and easily disconnecting the automatic weighing and recording mechanism, so that the scale may be used as an ordinary scale whenever desired, and also to further improve the general construction and operation of my automatic recording and weighing scale, as shown and described in my previous Letters Patent, No. 317,432, May 5, 1885.

In the accompanying drawings, which form a part of this specification, and in which similar letters of reference indicate like parts, Figure 1 is a plan view of a device embodying my invention. Fig. 2 is a side elevation or diagram view showing the scale-platform and its connection with the weighing mechanism. Fig. 3 is a perspective view of the scale-platform. Fig. 4 is a side elevation of the circuit-closing mechanism, which is operated by the car-wheel operating-levers on the scale-platform. Fig. 5 is a side elevation of the switch, which is turned to the right or left, according as the cars to be weighed are approaching the scale-platform from the right or left. Fig. 6 is a plan view of the printing or recording lever. Figs. 3, 4, 5, and 6 also together show a diagram of the circuits, the several circuits being connected by dotted lines between the several figures. Fig. 7 is an enlarged detail view showing the end of the scale-beam and its variable counterpoise. Fig. 8 is a detail section on line 8 8 of Fig. 1, showing in elevation the printing hammer or lever and the magnet for releasing the same. Fig. 9 is a detail front view of the printing-hammer. Fig. 10 is a bottom view of the same. Fig. 11 is a section on line 11 11 of Fig. 1. Fig. 12 is a detail section on line 12 12 of Fig. 11, and Fig. 13 is a detail elevation of one of the paper-feed rollers. Fig. 14 is a detail view of the mercury contact, which operates or releases the paper-feed mechanism. Fig. 15 is a section on line 15 15 of Fig. 6. Fig. 16 is a section on line 16 16 of Fig. 15. Fig. 17 is a section on line 17 17 of Fig. 16. Fig. 18 is a detail elevation of the clock-work motor which operates the paper-feed. Fig. 19 is an enlarged detail section on line 19 19 of Fig. 1, showing the means for connecting and disconnecting the printing-wheel from the scale-beam. Fig. 20 is a longitudinal vertical section on line 20 20 of Fig. 3, and Fig. 21 is a section on line 21 21 of Fig. 3. Fig. 22 is a cross-section of the type-wheel, and Fig. 23 is a view of a short piece of the paper strip as printed. Fig. 24 is a detail view of the friction-wheels upon which the type-wheel shaft rests. Fig. 25 is an enlarged view of a portion of the type-wheel, showing the wooden wheel and the metal tire thereon with the type. Fig. 26 is a detail side elevation of a part hereinafter described.

In said drawings, A represents the scale-platform, A' the track-rails thereon, and A² the supplemental or switch track at the side of the track-rails A', and mounted upon the rigid or immovable frame-timbers A³, so that the track with which the scale-platform rails A' are connected may be used for general purposes without passing the cars over the scale-platform when desired. This results in a considerable saving of track-space, the scale-platform A being bridged by the timber A³, upon which the rigid track-rail A² rests.

B represents the scale-beam, which is connected in the usual manner with the scale-platform through scale-levers and connecting-links. This scale-beam is furnished with the usual sliding poises, B', and removable poise-weights B². The scale-beam is furnished at its end with an arm, $b$, to which is connected the variable counterpoise $b'$ by a link, $b^2$. The arm $b$ is removably secured to the end of the scale-beam B by bolts $b^3$, so that the scale-beam may be readily disconnected from its variable counterpoise whenever it is desired to weigh in the ordinary manner by use of the sliding and removable poises B' B². The variable counterpoise b' preferably consists of a coil-spring inclosed in a dash-pot cylinder, b⁴, the connecting-link b² being furnished with a disk or piston, b⁵, to serve as the dash-pot piston. The dash-pot may contain a liquid, or the air may serve as the dash-pot fluid. The arm b is provided with a right-angled arm, b⁶, which projects out laterally from the scale-beam sufficiently to give proper room for the printing-wheel C below, with which it is connected. The printing-wheel shaft C' is journaled at each end on a pair of comparatively large anti-friction wheels, C² C². (See Fig. 16.)

The printing-wheel C is furnished with type c on its periphery, which are preferably sharp-faced metal type suitable for making an impression upon the paper by embossing or impression, so that no inking device will be required. The shaft C' of the printing-wheel is furnished with a spur-gear, c', which meshes with a rack, c², connected by a link, c³, with the arm b⁶. To diminish the friction of this rack c² and keep it properly in contact with the gear c', I provide the friction-roller c⁴, mounted on a bracket, c⁵, Fig. 16, attached to the frame-posts X. The link c³ is connected to the arm b⁶ by means of a threaded nut, c⁶, and swivel-pin c⁷ and spring-pin c⁸, the latter passing through a suitable hole in the swivel-pin c⁷, Fig. 19. By turning the nut c⁶ the type-wheel may be adjusted to stand at the zero-point when the scale is in balance.

The type-wheel shaft C' is furnished with a cord and weight, C³, to counterbalance the friction of the rack, gear, and type-wheel shaft, and thus eliminate this source of error. Set-screws c⁹ are arranged just above the type-wheel shaft C' to hold said shaft in place between the friction-wheels, which constitute its bearing. These set-screws should be so adjusted as not to touch the shaft. By pulling out the spring-pin c⁸, Fig. 19, the type-wheel shaft may be disconnected from the scale-beam almost instantly whenever it is desired to disconnect the printing mechanism from the scale.

The type-wheel C is made of light well-seasoned wood, having a thin metal band or tire, c¹⁰, to which the electrotype strip having the figure-types c thereon is secured by soldering or otherwise.

The type-wheel C projects through a slot or opening, e, in the box or case E, inclosing the same, so that the paper strip or ribbon D may be fed across the same transversely.

The case or frame E is provided with an elastic pad or cushion, e', Fig. 8, to receive the pointer-mark type f on the impression block or hammer F. The slot e is made long enough to allow two or more consecutive type on the type-wheel to be exposed to the blow of the hammer, the face of the hammer F being also, of course, wide enough to impinge the paper against two or more consecutive type. The pointer-type f on the impression or printing hammer produces a point or mark on the strip of paper at the true weight, and the relative position of this pointer-mark to the numbers printed by the type-wheel on the paper strip will indicate approximately the true weight as a fraction between the numbers printed on the paper strip. By this means, with a comparatively limited number of type on the type-wheel, the weight may be indicated to a very small fraction of the total number of pounds capable of being weighed by the particular scale employed. The face of the impression block or hammer F is provided with an elastic strip of rubber, f', or other elastic material, to prevent injury to the type on the type-wheel and cause the same to make a clear indentation or impression on the paper. The printing-lever F'' is pivoted at f² and is caused to descend to make the impression by a spring, f³. A rubber or other elastic cushion, f⁴, regulates the force of the blow against the type-wheel. The printing-lever is held in its elevated position by a spring-pawl, f⁵, to which is attached an armature, f⁶. A magnet, F', operates to move the pawl and release the printing-lever at the proper instant. The printing-lever is raised or elevated by a lever, G, pivoted at g to the frame of the machine, which is furnished with an overhanging spring-arm, g', that impinges against the impression-lever F. (See Figs. 1 and 8.) The lever G is operated by a lever, G', which projects in the path of the wheel of the car, and is located, preferably, at about the middle of the scale-platform. This lever G' is pivoted at g² to a case or box, g³, located on the platform near one of the track-rails A'. The lever G' is connected to the lever G by suitable cords, g⁴, passing over or around pulleys g⁵, so that when the first wheel of the car passes over the lever G' the printing-lever will be raised and held in its elevated position, as indicated at Fig. 8, ready to strike the blow the instant the type-wheel reaches a balance to indicate the true weight. The spring f⁸ holds the pawl f⁵ in position to engage the impression-lever F the moment said lever is raised. A spring, g⁶, serves to retract the lever G out of the way of the printing-lever the moment the wheel passes off the lever G'. The wheel-operated lever G' is located near the middle of the scale-platform, as indicated in the drawings, so that whether the car be a long one or a short one none of its wheels can stand upon the lever G' at the time the printing-lever should descend to print the weight.

The paper strip or ribbon D is fed from a spool, D', journaled on the standards d, over suitable tension spools or pulleys, d' d² d³ d⁴ d⁵, to a winding-spool, D². The winding-spool D² is operated by a clock-work or spring motor, D³, which may be of any well-known or usual construction, Figs. 15 and 18. It should have an escapement, D⁴, to properly regulate the speed of the paper-feed. The paper-pulley d⁵ is furnished in its rim with a recess or opening, $d^6$, into which a pin, $d^7$, projects to lock or hold the paper-feed mechanism, as is clearly shown in Figs. 11 and 12. This pin is furnished with an armature, $d^8$, and is retracted at the proper time by means of a magnet, $D^5$. Except when the magnet is energized the pin $d^7$ is forced against the face of the pulley $d^5$ by a spring, $d^9$. (See Fig. 1.) The diameter of the pulley $d^5$ determines the length or extent to which the paper strip is fed for each weight printed thereon.

The scale-platform A is furnished near each end with a wheel-operated lever, $a$, which projects at the side of the track-rail $A'$, so that the lever will be depressed or operated by the flange of each car-wheel as the car moves onto the scale-platform. These wheel-operated levers $a$ are pivoted in suitable boxes or cases, $a'$, and are connected by lines or cords $a^2$ passing over pulleys $a^3$ with a pawl-lever, H, through a connecting spring-link, $a^4$, and coupling-piece $a^5$, so that either one of the levers $a$ $a$ may be connected with the pawl-lever H, as desired, according as the train or car to be weighed is approaching from one direction or the other. The lines or cords $a^2$ are further furnished each with springs $a^6$ $a^6$, which serve to retract or elevate the levers $a$ $a$ the moment the wheel passes off the same. The pawl-lever H is furnished with a pivoted pawl, $h$, having spring $h'$ to hold it in engagement with the ratchet K. The pawl-lever H is pivoted to the frame at $h^2$, and is furnished with a spring, $h^3$, and with a stop-screw, $h^4$, to limit its upward movement. It also has an adjustable stop-screw, $h^5$, to limit its downward movement. A check-pawl, $h^6$, furnished with a spring, $h^7$, serves to hold the ratchet-wheel K from backward movement. The ratchet-wheel K is furnished with four contact-points, $k$, equidistant apart, there being sixteen teeth upon the ratchet-wheel, so that at every fourth impulse of the levers $a$ and pawl-lever H the ratchet-wheel will be turned one-fourth of a revolution, or sufficient to bring one of the contacts $k$ into connection with the stationary contact-piece $k'$, and thus close the circuit N at this point. The electrical connection between the contacts $k$ on the ratchet-wheel and the ring $k^2$ on the shaft of the ratchet-wheel is indicated by the dotted lines $k^3$ in Fig. 4. The connection between the circuit-wire N and the ring $k^2$ is through a brush or spring, $k^4$. The other or opposite rail $A'$ on the scale-platform is furnished near each end with two long bail-like levers, P, pivoted at $p$ to the scale-platform, and which project in the path of the wheel, so as to be operated thereby. These bail-levers P are each furnished with an arm or projection, $p'$, which operates a movable or spring contact-piece, $p^2$, to close the circuit N at the contact-piece $p^3$. The lever $p'$ and contacts $p^2$ $p^3$ are inclosed in a suitable box, $a^8$.

R R' are double switch-levers, (see Figs. 1 and 5,) which are operated by hand, and which serve to close the circuit N at the fixed contact-points $r$ $r'$ $r^2$, according as the double switch-lever is shifted to the right or left, as is shown in Fig. 5.

The bail-levers P are made comparatively long, so that whether the car to be weighed be a long one or a short one the front wheel of the car will be on the bail-lever P at the end of the scale-platform and close the circuit at $p^2$ $p^3$ the moment or shortly after the last wheel of the car passes the ratchet-wheel-operating lever $a$ on the opposite end of the scale-platform.

By making the bent or bail levers P long enough it will thus be seen that the same scale-platform and its automatic levers $a$ $a$ may be adapted to weigh cars of any different length. All that is required is that the front wheel of the car must depress the bail-lever P, and thus close the circuit N at the time or shortly after the fourth and last wheel of the car passes the operating-lever $a$ and closes the circuit N at $k$ $k'$. This circuit N being thus closed at the two points above named, the printing-lever operating or releasing magnet $F'$ will be energized, and the printing-lever will be permitted to descend and strike the type-wheel C. The magnet $D^5$, which operates the paper-feed pulley, is included in a circuit, M, having a battery, $M'$, and which is closed by a contact-lever, $m$, having a contact-pin, $m'$, which makes connection with a mercury contact, $m^2$. (See Fig. 14.) The lever $m$ is operated by the printing-lever $F''$, the lever $m$ projecting across the path of said printing-lever, as indicated in Fig. 6.

In operation the double switch R R' is swung to the left, as indicated in Fig. 5, when the car to be weighed is moving across the scale-platform in the direction indicated by the arrow in Fig. 3, so as to close the circuit N at the double switch when the bail-lever P is closed by the front wheel of the car at the farther end of the scale-platform. When the car is approaching from the opposite direction, the double switch R will be swung to the left and the spring coupling-link $a^4$ will be connected with the other coupling-piece, $a^5$. As the car passes onto the scale-platform each wheel will pass over and operate the lever $a$, and thus turn the ratchet-wheel the distance of four teeth, and thereby close the circuit N at $k$ $k'$. At the same time the bail-lever P will close the circuit N at $p^2$ $p^3$, and thus energize the magnet $F'$ and release the uplifted impression-lever F.

If at any time it is desired to disconnect the automatic printing mechanism from the scale, this may be done either by removing the arm $b$ from the scale-beam B or by disconnecting the variable counterpoise therewith and the printing-wheel C. This facility of connecting or disconnecting the automatic printing and recording mechanism with the ordinary scale-beam is a matter of great convenience, especially where, for any cause, the automatic mechanism happens to get out of order or the accuracy of its operation is brought into question.

The type-wheel C is made of light well-seasoned wood, furnished with an electrotype strip or band, as before described, so that the type-wheel may have as small an amount of inertia as possible consistent with its requisite diameter to afford space for a sufficient number of type on its periphery. By this means I am enabled to produce a very light type-wheel, and one of sufficient strength or stiffness to properly resist the blow of the printing lever or hammer, and I am thus enabled to produce much more accurate results in recording the true weight than could be done if a metallic wheel were employed.

In operation when a very long car—say a thirty-four-foot car—coupled in a train is being weighed it will simultaneously close the circuit by its front and rear wheels, simultaneously operating both the levers P and a. When a very short car coupled in a train is being weighed—say a twenty-eight-foot car—its last wheel operates the lever a and closes the circuit at one point before the preceding car has entirely left the scale-platform. The short car then advances a distance of four or five feet before its front wheel operates the lever P and closes the circuit at the other point. The lever P will, however, in this case be operated before the succeeding car in the train touches the scale-platform. The levers a and P are so located on the scale-platform and the length of the long lever P so adjusted or determined that the shortest car will not, by its last wheel, operate the lever a until after the last wheel of the preceding car passes off of the lever P. It will thus be seen that short or long cars can be weighed with equal facility.

The copper electrotype band c of the printing-wheel C is coated on the outside with nickel by electroplating in order to harden and give greater strength and body to the type. By making the type on an electrotype strip of copper or like soft metal I am enabled very easily to properly adjust the position of the type in respect to each other and in relation to the counterpoise-spring, so that each type or figure will be in the right place to indicate the true weight. This I do by simply stretching the electrotype strip C in such parts as may be required, thus securing the relative distance between the type-figures thereon.

In car-scales I usually provide the type-wheel with figures to indicate only the number of hundreds of pounds, the units and tens places being omitted. The pointer-type $f$ will indicate with approximate accuracy the fraction of the hundred pounds.

I claim—

1. The combination, in a printing or recording scale, of the scale-beam and variable counterpoise, with a type-wheel connected with and operated by the scale-beam, an impression block or hammer, and a dash-pot and its piston connected with the type-wheel for regulating the movement of the type-wheel and holding the same stationary at the true balance during the printing operation, substantially as specified.

2. The combination, in an electric printing-scale for weighing railroad-cars, of the scale-platform having track-rails thereon with a long lever parallel to one of the track-rails, an electric circuit and electric printing mechanism, and a pair of contact-points closed by said lever when depressed by the front wheel of the car, substantially as specified.

3. The combination, in an automatic electric scale for weighing railroad-cars, with the scale-platform having track-rails thereon, of the electric circuit and electric printing mechanism, mechanism for closing the electric circuit when the last wheel of the car passes onto the scale-platform, and a long bail-lever for holding said circuit closed by the front wheel of the car, substantially as specified.

4. The combination, in an electric printing weighing-scale, with the scale-beam, type-wheel connected therewith, printing-levers, and the scale-platform having track-rails thereon, of a wheel-operated lever in the middle of the scale-platform for raising the printing-lever, and mechanism operated by the last wheel of the car as it passes onto the scale-platform for closing an electric circuit to release the printing-lever, substantially as specified.

5. The combination, in an automatic printing weighing-scale, of the scale-platform having track-rails thereon with the printing mechanism, and a wheel-operated lever, G', adjacent to the track-rail and near the middle of the scale-platform for giving motion to the printing mechanism preparatory to the printing operation, substantially as specified.

6. In an automatic printing weighing-scale, the combination of the printing-wheel and printing-lever, a spring for operating the printing-lever, the scale-platform, the wheel-operated lever on the scale-platform for raising the printing-lever, and a pawl for holding it in its elevated position until ready for printing, substantially as specified.

7. In an automatic printing weighing-scale, the combination of the printing-wheel and printing-lever, a spring for operating the printing-lever, the scale-platform, the wheel-operated lever on the scale-platform for raising the printing-lever, and a pawl for holding it in its elevated position until ready for printing, and mechanism operated or controlled by the passage of the last wheel of the car onto the scale-platform for releasing the printing-lever, so that its spring may cause it to strike the blow against the printing-wheel, substantially as specified.

8. The combination, in a railroad-car weighing-scale, of the scale-platform A, having track-rails A' thereon, with track-rails A² at the side of the track-rails A', rigidly supported, one of said track-rails A² bridging the scale-platform, substantially as specified.

9. The combination of the weighing-scale platform A, having track-rails A', an electric circuit, the operating-lever $a$ for closing said electric circuit, and a bail-lever, P, at the opposite end of the scale-platform for closing the circuit at another point, substantially as specified.

10. The combination of weighing-scale platform A, track-rails A' thereon, an electric circuit, the operating-levers $a$ $a$, one at each end of the scale-platform for closing said electric circuit, and operating-levers P P, for closing said circuit at another point, and a switch, R R', for causing the circuit to be closed by one or the other of said levers P P, according as the car to be weighed approaches from one direction or the other, substantially as specified.

11. The combination of the scale-platform A and track-rails A' thereon, car-wheel-operated lever $a$, pawl-lever H, and a line and pulleys connecting the same with said lever $a$, the ratchet-wheel K, having contacts $k$ at intervals for closing an electric circuit, a printing-wheel connected to the scale-beam, a printing-lever, a car-wheel-operated lever on the scale-platform for raising the printing-lever in an elevated position, and a magnet included in the circuit closed by said contacts $k$ for releasing said printing-lever, substantially as specified.

12. The combination of the scale-platform A and track-rails A' thereon, car-wheel-operated lever $a$, pawl-lever H, and a line and pulleys connecting the same with said lever $a$, the ratchet-wheel K, having contacts $k$ at intervals for closing an electric circuit, a printing-wheel connected to the scale-beam, a printing-lever, a car-wheel-operated lever on the scale-platform for raising the printing-lever in an elevated position, and a magnet included in the circuit closed by said contacts $k$ for releasing said printing-lever, and a wheel-operated bail-lever, P, at the opposite end of the scale-platform for simultaneously closing said electric circuit at another point, substantially as specified.

13. The combination, in an automatic electric weighing-scale, of the electric circuit, with the scale-platform, a wheel-operated lever for closing the electric circuit by the last wheel of the car as it passes onto the scale-platform, and a wheel-operated lever near the opposite end of the scale-platform for simultaneously closing said circuit by the front wheel of the car, substantially as specified.

14. In an automatic printing weighing-scale, the scale-platform A, furnished with track-rails A' and with car-wheel-operated levers for controlling the operation of the printing mechanism located at or near each end of the scale-platform, so that one of said levers will be operated by the last wheel of the car and the other by the front wheel of the car, whereby the scale-platform is adapted to weigh long or short cars while coupled in a train and passing over the scale-platform, substantially as specified.

15. The combination, in an automatic weighing and printing scale, with the scale-beam and variable counterpoise, of a wooden type-wheel connected with the scale-beam and adjusted or controlled thereby, and having a thin metal band furnished with type, whereby the error due to the inertia of a heavy type-wheel is eliminated, substantially as specified.

16. The combination, in an automatic printing weighing-scale, with the scale-beam and variable counterpoise, of a wooden type-wheel connected with the scale-beam and adjusted or controlled thereby, and having an electrotype peripheral face, whereby the error due to the inertia of a heavy type-wheel is eliminated, substantially as specified.

17. The combination, with the scale-beam B, of the laterally-projecting arm $b^6$, type-wheel C, and a connecting-link detachably secured to said laterally-projecting arm, substantially as specified.

18. The combination, with scale-beam B, of the type-wheel C, connecting-link $c^5$, adjusting-nut $c^6$, and swivel $c^7$, connected to said scale-beam, substantially as specified.

EDWARD H. AMET.

Witnesses:
H. M. MUNDAY,
EDMUND ADCOCK.